United States Patent
Nichols et al.

(10) Patent No.: US 8,871,130 B2
(45) Date of Patent: **\*Oct. 28, 2014**

(54) SOLID STATE DRAWING A FILLED POLYMER COMPOSITION TO A STABLE EXTENT OF CAVITATION AND DENSITY

(75) Inventors: Kevin L. Nichols, Freeland, MI (US); Brett M. Birchmeier, Midland, MI (US)

(73) Assignee: Eovations, LLC, Grand Rapids, MI (US)

( * ) Notice: Subject to any disclaimer, the term of this patent is extended or adjusted under 35 U.S.C. 154(b) by 1147 days.

This patent is subject to a terminal disclaimer.

(21) Appl. No.: 11/974,663

(22) Filed: Oct. 15, 2007

(65) Prior Publication Data

US 2008/0111278 A1    May 15, 2008

Related U.S. Application Data

(60) Provisional application No. 60/858,122, filed on Nov. 10, 2006, provisional application No. 60/876,053, filed on Dec. 20, 2006.

(51) Int. Cl.
*B29C 55/30*    (2006.01)

(52) U.S. Cl.
CPC ..................................... *B29C 55/30* (2013.01)
USPC ........................... 264/322; 264/323; 264/330

(58) Field of Classification Search
CPC ...................................................... B29C 55/30
USPC ......................................... 264/322, 323, 330
See application file for complete search history.

(56) References Cited

U.S. PATENT DOCUMENTS

| | | | |
|---|---|---|---|
| 4,877,393 A | 10/1989 | Lo | |
| 4,938,913 A | 7/1990 | Ward et al. | |
| 5,096,654 A | 3/1992 | Craggs et al. | |
| 5,169,587 A * | 12/1992 | Courval | 264/323 |
| 5,169,589 A * | 12/1992 | Francoeur et al. | 264/323 |
| 5,204,045 A * | 4/1993 | Courval et al. | 264/323 |
| 5,234,652 A | 8/1993 | Woodhams et al. | |
| 5,474,722 A | 12/1995 | Woodhams | |
| 6,858,122 B2 | 2/2005 | Kondo et al. | |
| 6,939,496 B2 | 9/2005 | Maine et al. | |
| 7,344,672 B2 | 3/2008 | Schroeder et al. | |
| 2005/0171246 A1 | 8/2005 | Maine et al. | |
| 2005/0192382 A1 | 9/2005 | Maine et al. | |
| 2006/0057348 A1 | 3/2006 | Maine et al. | |

FOREIGN PATENT DOCUMENTS

| | | |
|---|---|---|
| EP | 1242220 B1 | 12/2004 |
| GB | 2060469 | 5/1981 |
| WO | WO-80/02671 | 12/1980 |
| WO | WO2004/009334 A1 | 1/2004 |
| WO | 2006041973 | 4/2006 |

OTHER PUBLICATIONS

D. M. Biggs, Mechanical Property Enhancement of Semicrystalline Polymers—A Review, Polymer Engineering and Science, vol. 28, No. 13, 1988, pp. 830-841.
M. Soya, et al., Polypropylene Composite Materials Oriented by Solid-State Drawing: Low-Temperature Impact Behaviour, Journal of Material Science, vol. 28, 1993, pp. 6515-6523.
W.R. Newson and F.R. Maine, Oriented Polypropylene Compositions Made With Mica, handout from 8th International Conference on Woodfiber-Plastic Composites, Madison, Wisconsin, May 23-25, 2005.
W.R. Newson and F. R. Maine, Plastic Reactive Fillers/Thermplastic Compsites, handout from 8th International Conference on Woodfiber-Plastic Composites; Madison, Wisconsin, USA May 23-25, 2005.
W.R. Newson and F. R. Maine, Oriented Polypropylene Composites Made With Calcium Carbonates, handout from 8th International Conference on Woodfiber-Plastic Composites; Madison, Wisconsin, USA May 23-25, 2005.
Andrzek Pawlak and Andrzek Galeski, Plastic Deformation of Crystalline Polymers: The Role of Cavitation and Crystalinity, Macromolecules 2005, 38, 96809697.
Y.S. Kim, et al., Processing/Structure/Propety Relationships for Artificial Wood Made From Stretched PP/Wood-Fiber Composites, Antec 2004, 1608-1613.
Chaffey, et al.; "Orientation in Polypropylene Sheets Produced by Die-Drawing and Rolling"; Polymer Engineering & Science, wiley, Hoboken, NJ, vol. 37, No. 11; (Nov. 1997); pp. 1774-1784.
Coates, et al.; "Drawing of Polymer Through a Conical Die"; Polymer 20, 1553, (1979).
Maine; Oriented Wood-Polymer Composites and Related Materials, Wood-Polymer Composites, (2008), pp. 208-226; Woodhead Publishing Limited, Cambridge, England.
O. Richmond; Theory of Streamlined Dies or Drawing and Extrusion, Mechanics of the Solid State, (1968), pp. 154-167.

\* cited by examiner

*Primary Examiner* — Richard Crispino
*Assistant Examiner* — Elizabeth Royston
(74) *Attorney, Agent, or Firm* — McGarry Bair PC

(57) ABSTRACT

Draw a polymer composition by providing a polymer composition containing an orientable polymer having a softening temperature and a filler; conditioning the temperature of the polymer composition at or below its softening temperature; and drawing the polymer composition at a draw rate of at least 127 centimeters per minute in order to achieve an oriented filled polymer composition demonstrating a stable extent of cavitation with draw rate.

13 Claims, No Drawings

SOLID STATE DRAWING A FILLED POLYMER COMPOSITION TO A STABLE EXTENT OF CAVITATION AND DENSITY

This application claims benefit of priority from U.S. Provisional Application Ser. No. 60/858,122, filed on Nov. 10, 2006, and U.S. Provisional Application Ser. No. 60/876,053, filed on Dec. 20, 2006.

BACKGROUND OF THE INVENTION

1. Field of the Invention

The present invention relates to a solid state drawing process for preparing cavitated oriented polymer compositions that contain fillers.

2. Description of Related Art

Oriented polymer compositions offer benefits in strength over non-oriented polymer compositions. Historically, free draw processes have provided polymeric films with the benefit of increased strength through orientation. Free draw processes are free of physical restraints controlling drawing and offer little control over a final polymer article's shape. Therefore, free draw processes become less desirable as article cross sectional shapes become more complex.

Efforts to establish polymer orientation in articles having cross sections more complex than a thin film eventually led to development of solid state die drawing processes. Solid state die drawing processes draw a polymer composition, at a temperature below the softening temperature of the polymer composition through a drawing die. The drawing die forces the polymer composition to converge towards a specific shape while orienting polymer chains. A drawing die provides more control over final article shape during a drawing process than free drawing processes.

Orientation of filled polymer compositions is becoming of particular interest, especially for forming articles of large cross sections (all cross sectional dimensions greater than 1.5 millimeters). Filler offers numerous benefits, perhaps the most recognized is reduction in raw material cost for the polymer composition. Use of wood fiber fillers in oriented polymer compositions has been particularly popular for fabricating oriented polymer compositions that serve as an alternative to wood decking materials (i.e., composite decking).

Certain fillers also induce cavitation during the solid state drawing process. Cavitation creates void volume in a polymer composition. For example, European Patent 1242220B1 provides an example a polypropylene composition filled with wood filler (composition density of about 1 gram per cubic centimeter) that is drawn at a drawing rate of 48 inches (122 centimeters) per minute to obtain an oriented polymer composition that has a density of 0.59 grams per cubic centimeter. Drawn compositions containing mica filler in polypropylene also reveal void volumes from cavitation of up to 28.5%. (W. R. Newson and F. R. Maine, ORIENTED POLYPROPYLENE COMPOSITIONS MADE WITH MICA, handout from 8$^{th}$ International Conference on Woodfiber-Plastic Composites, Madison, Wis., May 23-25, 2005). Cavitation can be beneficial for reducing oriented polymer composition density. Therefore, fillers may concomitantly reduce the cost and density of an oriented polymer composition. Both of these features are attractive for preparing building materials such as composite decking.

It is desirable to achieve a stable level of cavitation so as to produce boards of consistent density despite process condition fluctuations, such as fluctuations in draw rate, in order to produce oriented filled polymer compositions of having consistent properties (i.e., density).

BRIEF SUMMARY OF THE INVENTION

The present invention solves a problem with achieving a stable extent of cavitation in a polymer composition containing fillers upon changing draw rate during a solid state drawing of the polymer composition.

Experimentation leading to the present invention revealed that the extent of cavitation in filled polymer compositions increases with draw rate, but surprisingly only up to a certain draw rate. Increasing the drawing rate beyond that certain draw rate has minimal if any affect on final composition void volume due to cavitation, therefore final composition density. In other words, a plot of extent of cavitation (or void volume due to cavitation) versus draw rate unexpectedly reaches a plateau as draw rate increases.

The present invention is a process for solid state drawing a polymer composition comprising: (a) providing a polymer composition comprising a filler and an orientable polymer having a softening temperature; (b) conditioning the temperature of the polymer composition to within a drawing temperature range that is between the softening temperature and 50° C. below the softening temperature, inclusive of endpoints; and (c) initiating drawing of the polymer composition while the polymer composition remains within the drawing temperature range and drawing the polymer composition at a drawing rate to produce an oriented polymer composition; wherein the draw rate is 127 centimeters (50 inches) per minute or faster.

Preferred embodiments of the present invention include any one or combination of the following further limitations: drawing occurs through a drawing die, desirably a drawing die that induces proportional drawing of the polymer composition; the polymer composition remains within the drawing temperature range as it draws; the filler is an inorganic filler, especially an inert inorganic filler, more especially a filler selected from talc (including any or a combination of materials and grades commonly available and known under the name "talc"), fly ash, clay and calcium carbonate; the orientable polymer is a polyolefin, especially a polyolefin selected from polypropylene-based polymer and high density polyethylene; the draw rate is 150 centimeters per minute or more, 190 centimeters per minute or more or 254 centimeters per minute or more; the drawing temperature range is between 10° C., even 20° C., below the softening temperature and 50° C. below the softening temperature of the polymer composition; the filler is present at a concentration of 20 percent by weight or more relative to polymer composition weight after drawing; the process induces at least 30 percent by volume of void space into the polymer composition; the polymer composition experiences a nominal draw ratio of 1.2 or more and 8 or less; and wherein all cross sectional dimensions of the oriented polymer compositions are greater than 1.5 millimeters.

The present invention is useful for preparing oriented filled polymer compositions suitable for building and construction applications.

DETAILED DESCRIPTION OF THE INVENTION

Terms

"Solid state" refers to a polymer (or polymer composition) that is below the softening temperature of the polymer (or polymer composition). Hence, "solid state drawing" refers to drawing a polymer or polymer composition that is at a temperature below the softening temperature of the polymer (or polymer composition).

"Polymer composition" comprises at least one polymer component and can contain non-polymeric components.

"Softening temperature" ($T_s$) for a polymer or polymer composition having as polymer components only one or more than one semi-crystalline polymer is the melting temperature for the polymer composition.

"Melting temperature" ($T_m$) for a semi-crystalline polymer is the temperature half-way through a crystalline-to-melt phase change as determined by differential scanning calorimetry (DSC) upon heating a crystallized polymer at a specific heating rate. Determine $T_m$ for a semi-crystalline polymer according to the DSC procedure in ASTM method E794-06. Determine $T_m$ for a combination of polymers and for a filled polymer composition also by DSC under the same test conditions in ASTM method E794-06. If the combination of polymers or filled polymer composition only contains miscible polymers and only one crystalline-to-melt phase change is evident in its DSC curve, then $T_m$ for the polymer combination or filled polymer composition is the temperature half-way through the phase change. If multiple crystalline-to-melt phase changes are evident in a DSC curve due to the presence of immiscible polymers, then $T_m$ for the polymer combination or filled polymer composition is the $T_m$ of the continuous phase polymer. If more than one polymer is continuous and they are not miscible, then the $T_m$ for the polymer combination or filled polymer composition is the lowest $T_m$ of the continuous phase polymers.

"Softening temperature" ($T_s$) for a polymer or polymer composition having as polymer components only one or more than one amorphous polymer is the glass transition temperature for the polymer composition.

"Glass transition temperature" ($T_g$) for a polymer or polymer composition is as determined by DSC according to the procedure in ASTM method E1356-03. Determine $T_g$ for a combination of polymer and for a filled polymer composition also by DSC under the same test conditions in ASTM method E1356-03. If the combination of polymer or filled polymer composition only contains miscible polymers and only one glass transition phase change is evident in the DSC curve, then $T_g$ of the polymer combination or filled polymer composition is the temperature half-way through the phase change. If multiple glass transition phase changes are evident in a DSC curve due to the presence of immiscible amorphous polymers, then $T_g$ for the polymer combination or filled polymer composition is the $T_g$ of the continuous phase polymer. If more than one amorphous polymer is continuous and they are not miscible, then the $T_g$ for the polymer composition or filled polymer composition is the lowest $T_g$ of the continuous phase polymers.

If the polymer composition contains a combination of semi-crystalline and amorphous polymers, the softening temperature of the polymer composition is the softening temperature of the continuous phase polymer or polymer composition. If the semi-crystalline and amorphous polymer phases are co-continuous, then the softening temperature of the combination is the lower softening temperature of the two phases.

"Drawing axis" is a straight line through an oriented polymer composition that extends in the direction that the center of mass (centroid) of the polymer composition is moving as the polymer composition is drawn in a solid state drawing process.

"Cross sections" herein are perpendicular to the drawing axis unless the reference to the cross section indicates otherwise. A cross section has a centroid and a perimeter that defines a shape for the cross section.

A "cross sectional dimension" is the length of a straight line connecting two points on a cross section's perimeter and extending through the centroid of the cross section. For example, a cross sectional dimension of a rectilinear four-sided polymer composition could be the height or width of the polymer composition.

"Substantially Stable" in reference to polymer composition density as a function of drawing rate means that there is 10 percent (%) or less difference in density between two identical polymer compositions after drawing in identical processes at drawing rates that differ by at least 10 centimeters per minute (cm/min), preferably at least 50 cm/min, more preferably at least 100 cm/min. Determine percent difference in density (% Δ) between two polymer compositions by dividing the absolute value of the average of each of their densities ($D_{ave}$) less either individual density ($D_1$ or $D_2$) by the $D_{ave}$ and multiplying by 100%:

$$\%\Delta = \frac{|D_{ave} - D_1(\text{or } D_2)|}{D_{ave}} \times 100\%$$

A polymer composition that has a substantially stable density at two different draw rates necessarily experiences a substantially stable extent of cavitation at those two draw rates.

Measure the density of a polymer composition according to American Society for Testing and Materials (ASTM) method D-792-00.

An artisan understands that a polymer composition typically has a variation in temperature through its cross section (that is, along a cross sectional dimension of the composition) during processing. Therefore, reference to temperature of a polymer composition refers to an average of the highest and lowest temperature along a cross sectional dimension of the polymer composition. The temperature at two different points along the polymer cross sectional dimension desirably differs by 10% or less, preferably 5% or less, more preferably 1% or less, most preferably by 0% from the average temperature of the highest and lowest temperature along the cross sectional dimension. Measure the temperature in degrees Celsius (° C.) along a cross sectional dimension by inserting thermocouples to different points along the cross sectional dimension.

"Drawing temperature" is a temperature within a drawing temperature range at which a polymer is conditioned prior to drawing and is the temperature at which the polymer exists upon the initiation of drawing.

Solid State Drawing Process

The present invention is a solid state drawing process. In a solid state drawing process pull a polymer composition comprising an orientable polymer with sufficient force so as to induce alignment of polymer molecules in the polymer composition. Aligning polymer molecules (polymer orientation or "orientation") is desirable to enhance the strength and modulus of a polymer composition. The drawing process can also induce cavitation in a filled polymer composition, which reduces the polymer composition's density.

Polymer compositions that can experience polymer orientation comprise a continuous phase of one or more orientable polymer. The orientable polymer may be amorphous or semi-crystalline (semi-crystalline polymers are those having a melt temperature ($T_m$)). The orientable polymer is desirably one or more than one semi-crystalline polymer.

Suitable orientable polymers include polymers and copolymers based on polypropylene, polyethylene (e.g., high density polyethylene), polymethylpentane, polytetrafluoroethylene, polyamides, polyesters, polycarbonates, polyethylene oxide, polyoxymethylene, polyvinyl chloride, polyvinylidene fluoride polymers having a weight-average molecular weight of from 200,000 to 800,000 g/mol, preferably 250,000 to 400,000 g/mol, liquid crystal polymers and combinations thereof.

Desirable orientable polymers include polymers based on polyethylene, polypropylene, and polyester (for example, polyethylene terephthalate) polymers. A first polymer is "based on" a second polymer if the first polymer comprises monomer repeat units of the second polymer. For example, a block copolymer is based on the polymers comprising the blocks. More particularly desirable orientable polymers include linear polyethylene having a weight-average molecular weight (Mw) from 50,000 to 3,000,000 g/mol; especially from 100,000 to 1,500,000 g/mol, even from 750,000 to 1,500,000 g/mol.

Particularly desirable orientable polymers include polyolefin polymers (polyolefins). Polyolefins tend to be more likely to undergo cavitation, particularly in combination with filler particles presumably because polyolefins are relatively non-polar and as such adhere less readily to filler particles. Linear polymers (that is, polymers in which chain branching occurs in less than 1 of 1,000 polymer units) are even more desirable.

Polypropylene (PP)-based polymers (that is, polymers based on PP) are especially desirable for use in the present invention. PP-based polymers generally have a lower density than other orientable polyolefin polymers. Therefore, PP-based polymers facilitate lighter articles than other orientable polyolefin polymers. PP-based polymers also offer greater thermal stability than other orientable polyolefin polymers. Therefore, PP-based polymers may also form oriented articles having higher thermal stability than oriented articles of other polyolefin polymers.

Suitable PP-based polymers include Zeigler Natta, metallocene and post-metallocene prolypropylenes. Suitable PP-based polymers include PP homopolymer; PP random copolymer (with ethylene or other alpha-olefin present from 0.1 to 15 percent by weight of monomers); PP impact copolymers with either PP homopolymer or PP random copolymer matrix of 50 to 97 percent by weight (wt %) based on impact copolymer weight and with ethylene propylene copolymer rubber present at 3 to 50 wt % based on impact copolymer weight prepared in-reactor or an impact modifier or random copolymer rubber prepared by copolymerization of two or more alpha olefins prepared in-reactor; PP impact copolymer with either a PP homopolymer or PP random copolymer matrix for 50 to 97 wt % of the impact copolymer weight and with ethylene-propylene copolymer rubber present at 3 to 50 wt % of the impact copolymer weight added via compounding, or other rubber (impact modifier) prepared by copolymerization of two or more alpha olefins (such as ethylene-octene) by Zeigler-Natta, metallocene, or single-site catalysis, added via compounding such as but not limited to a twin screw extrusion process. Particularly desirable is PP homopolymer or a random copolymer of propylene (PP-based copolymer) with 0.5 to 5 percent by weight ethylene.

Suitable PP-based polymers can be ultra-violet (UV) stabilized, and desirably can also be impact modified. Particularly desirable PP-based polymers are stabilized with organic stabilizers. The UV stabilized PP-based polymers can be free of titanium dioxide pigment thereby allowing use of less pigment to achieve any of a full spectrum of colors. A combination of low molecular weight and high molecular weight hindered amine-type light stabilizers (HALS) are desirable additives to impart UV stabilization to PP-based polymers. Suitable examples of commercially available stabilizers include IRGASTAB™ FS 811, IRGASTAB™ FS 812 (IRGASTAB is a trademark of Ciba Specialty Chemicals Corporation). A particularly desirable stabilizer system contains a combination of IRGASTAB™ FS 301, TINUVIN™ 123 and CHIMASSORB™ 119. (TINUVIN and CHIMASSORB are trademarks of Ciba Specialty Chemicals Corporation).

Oriented polymer compositions produced by the process of the present invention generally have cross sectional dimensions all greater than 1.5 millimeters (mm), typically 3 mm or more, more typically 5 mm or more after orientation. Such polymer compositions have relatively large cross sectional areas which distinguish them from films. Polymer compositions having a cross sectional dimension of 1.5 mm or less fall within film drawing technology. Drawing a polymer composition with relatively large cross sectional areas has challenges that film drawing processes do not have due to processing window differences. For instance, film drawing can occur at much lower drawing temperatures than large cross section compositions and temperature equilibration of the polymer composition cross section occurs more readily for films than for large cross section compositions. Draw stresses necessary for drawing films are much lower than for large cross section articles. As a result, a drawing process is more likely to exceed the break stress for larger cross section articles than for films. Additionally, achieving sufficient draw stress to induce cavitation throughout a polymer composition cross section is more challenging as the cross sectional dimensions of the polymer composition increase. Nonetheless, the present invention overcomes each of these challenges with polymer compositions that exceed 1.5 mm in each dimension.

Condition a polymer composition to within a drawing temperature range that is between the softening temperature ($T_s$) and 50° C. below $T_s$ of the polymer composition, inclusive of endpoints, and then initiate drawing of the polymer composition while the polymer composition remains within the drawing temperature range.

Desirably, condition a polymer composition to a drawing temperature within a drawing temperature range that is at least ten degree Celsius (° C.) below its $T_s$ prior to drawing. The drawing temperature range can be twenty ° C. or more, even thirty ° C. or more below the polymer composition $T_s$. Orientation during die drawing will not occur to any significant extent if the drawing temperature is above the orientable polymer composition's $T_s$. Compositions comprising inorganic filler typically experience insufficient cavitation to achieve a density of 0.8 g/cm³ if the drawing temperature is less than ten ° C. below $T^s$. On the other hand, slow draw rates are necessary if the drawing temperature is too low in order to avoid a risk of fracturing the polymer composition during drawing. Generally, the drawing temperature range is 40° C. or less below the polymer composition's $T_s$ in order to use economically reasonable draw rates and to achieve a desirable void volume through cavitation in a polymer composition having all cross sectional dimensions greater than 1.5 mm.

It is desirable to maintain the temperature of the polymer composition at a temperature within a range between the polymer composition's $T_s$ and 50° C. below $T_s$, inclusive of endpoints, while the polymer composition is drawn.

The solid state drawing process can either be a free draw process or can utilize a drawing die (die drawing process). In a free draw process a polymer composition necks apart from any physical constraint. Free drawing offers little control over the final polymer composition size and shape after drawing other than with the polymer composition shape prior to drawing. Therefore, the process preferably utilizes a drawing die.

A drawing die provides a physical constraint that helps to define a polymer composition's size and shape. Drawing occurs by conditioning a polymer composition to within a drawing temperature range and then pulling a polymer composition through a shaping channel in a drawing die. The shaping channel constricts the polymer composition in at least one dimension causing the polymer composition to draw to a general cross sectional shape. Die drawing processes advantageously provide greater control in shaping a polymer composition during a drawing process than is available in a free draw process.

The present process is not limited to a specific drawing die. However, the present invention advantageously employs a proportional drawing die. A proportional drawing die directs drawing of a polymer composition in such a manner so as to achieve an oriented polymer composition having a cross sectional shape substantially proportional to that of the polymer composition entering the proportional drawing die. A proportional die balances polymer forces directed towards a polymer cross section centroid such that variations in polymer composition or processing conditions do not affect the shape of the final oriented polymer composition. Therefore, the proportional drawing die advantageously provides predictable control over the final polymer composition shape despite changes in polymer composition or drawing process conditions.

Draw the polymer composition, unconstrained or through a drawing die, at a specific draw rate. In general, there is no particular lower limit on suitable draw rates. However, the present invention identifies a surprising result when using a draw rate of at least 127 centimeters (50 inches) per minute with a polymer composition containing filler. In general, faster draw rates provide for a more efficient process and provide the necessary stresses in the polymer composition to achieve a desired level of orientation and, hence, polymer strength. Faster draw rates also can induce more cavitation around filler particles. Cavitation creates void spaces in a polymer composition proximate to filler particles. Void spaces reduce the overall density of a polymer composition. Lower density is desirable in materials such as composite decking, fencing, siding and other applications currently employing wood products. Decreasing an oriented polymer composition's density facilitates handling during shipping and during construction using the material.

An upper limit for the draw rate is limited primarily by the drawing force necessary to achieve a specific draw rate. The drawing force should be less than the tensile strength of the polymer composition in order to avoid fracturing the polymer composition. Typically, the draw rate is 30.5 meters (1200 inches) per minute or less, more typically 9 meters (360 inches) per minute or less.

Increasing filler and increasing draw rate both typically increase void volume due to cavitation. A particularly desirable embodiment of the present invention is a process with sufficient filler and draw rate to achieve 30 volume-percent (vol %) or more, preferably 40 vol % or more, more preferably 50 vol % or more void space based on total oriented polymer composition volume.

Generally, it is desirable to achieve an oriented polymer composition density similar to or less than that of wood because the oriented-polymer composition often serves as a wood substitute. An oriented polymer composition may have a density below that of wood, provided it has sufficient structural integrity for its intended use. Desirably, oriented polymer compositions have a density of 0.8 grams per cubic centimeter (g/cc) or less, preferably about 0.7 g/cc or less, still more preferably about 0.6 g/cc or less after orientation through the process of the present invention. Measure the density according to ASTM method D-792-00. Oriented polymer compositions typically have a density of 0.35 g/cc or more, more typically 0.5 g/cc or more in order to assure sufficient strength for use as a wood substitute (for example, a flexural modulus of 1,380 megapascals or more as measured by ASTM method D-790-03 is generally sufficient for decking applications).

Fillers can be organic, inorganic or a combination of organic and inorganic. When the filler is a combination of organic and inorganic components it is desirable for the inorganic component to comprise 50 wt % or more, preferably 75 wt % or more of the filler.

Cellulosic fillers are one type of organic filler. Cellulosic fillers such as wood fiber and powder are popular in oriented polymer compositions having large cross sections (that is, cross sectional dimensions all greater than 1.5 mm). However, wood fiber and cellulosic materials in general, are susceptible to color bleaching when exposed to the sun, and to decomposition, mold and mildew, and microbial activity when exposed to humidity even when used as a filler within a polymer composition. These features (handicaps) can render cellulosics undesirable for use in filled polymer compositions exposed to sun and humidity.

Inorganic materials do not suffer from the handicaps of cellulosics. Therefore, inorganic filler can be more desirable than cellulosic fillers for use in oriented filled polymer compositions. Surprisingly, however, polymer compositions containing inorganic fillers typically require faster draw rates than wood filler in order to reach a cavitation plateau. Exploration of inorganic fillers led to the present surprising discovery that oriented polymer composition density tends to become substantially stable even for inorganic filled polymer compositions at a draw rate of 127 centimeters (50 inches) per minute or faster.

Inorganic filler may be reactive or inert. Reactive fillers react with water and include materials such as Portland cement and gypsum. Inert fillers do not react with water. Inert inorganic fillers are more desirable for achieving a stable polymer composition density because polymer composition containing the filler density is less likely to change upon exposure to moisture than with a reactive filler. Suitable inert inorganic fillers include talc (including any or a combination of material grades commonly known and available as "talc"), fly ash, calcium carbonate, clay (for example, kaolin), dolomite, glass beads, silica, mica, metal, feldspar, carbon black, nano-fillers, Wollastonite, glass fibers, metal fibers, and boron fibers. Particularly desirable inorganic fillers include talc, fly ash and calcium carbonate.

The optimum amount of filler in the polymer composition of the present process depends on target properties for the final oriented polymer composition. Low levels of filler results in low levels of cavitation (that is, low void volumes due to cavitation). Excessive levels of filler can reduce a polymer composition's strength if the polymer becomes discontinuous in the polymer composition. Typically, the amount of filler is 20 weight-percent (wt %) or more, preferably 30 wt % or more, more preferably 40 wt % or more and most preferably 45 wt % or more. Filler can be present in an amount of 60 wt % or more, even 70 wt % or more. Generally, the amount of filler is 90 wt % or less. If filler is present at a concentration exceeding 90 wt % the polymer composition tends to undesirably lose structural integrity. Determine wt % of filler based on the weight of polymer composition before drawing.

Increasing draw rate tends to increase cavitation. However, the present inventors have unexpectedly discovered that the extent of cavitation reaches a plateau at a certain draw rate for filled polymer compositions thereby providing a substantially stable oriented polymer density at draw rates equal to or faster than that certain rate. The draw rate where cavitation (that is, extent of void volume arising due to cavitation) stabilizes can vary depending on the type of filler. Polymer compositions containing organic fillers (for example, wood filler) tend to plateau at lower draw rates than polymer compositions containing inorganic fillers. Operating at a draw rate where void volume due to cavitation is stable is valuable in order to obtain an oriented polymer composition that has a substantially stable density despite intentional or unintentional fluctuations in process conditions, particularly draw rate.

Surprisingly, drawing a polymer composition using a draw rate of 127 centimeters per minute (cm/min) or faster is sufficient to achieve a substantially stable extent of cavitation regardless of whether the filler is organic or inorganic. That is, any two polymer compositions drawn at a drawing rate of 127 cm/min or faster and differing in drawing rate by at least 10 centimeters per minute (cm/min), preferably at least 50 cm/min, more preferably at least 100 cm/min will differ in density by 10% or less. Oriented polymer compositions can actually demonstrate 7% or less, even 5% or less, and even 2% or less difference in density due to extent of cavitation when drawing at a draw rate of 127 cm/min or faster even when the drawing rate differs by at least 10 centimeters per minute (cm/min), preferably at least 50 cm/min, more preferably at least 100 cm/min. As the examples provided herein show, differences in density due to cavitation can even be less than 1% when operating at a drawing rate of 127 cm/min or faster. The draw rate is desirably 150 centimeters (60 inches) or more per minute, more preferably 200 centimeters (79 inches) or more per minute to concomitantly increase production efficiency and ensure density due to cavitation experiences minimal fluctuation with draw rate fluctuations.

The present invention ideally utilizes a nominal draw ratio of 1.2 or more, preferably 1.5 or more, more preferably two or more and can employ a nominal draw ratio of three or more, four or more, five or more, even six or more. Nominal draw ratio corresponds to the cross sectional surface area of a polymer composition prior to drawing divided by the polymer cross sectional area as it exits a drawing die or, if there is no drawing die, the final cross sectional area of the oriented polymer composition. Increasing polymer orientation increases polymer composition strength. Desirably, the process of the present invention produces polymer compositions having a modulus of elasticity (MOE) of at least 400,000 pounds per square inch (2.8 giga pascals (GPa)) according to ASTM D7032. An upper limit on nominal draw ratio typically depends on the polymer composition and the drawing force the composition will tolerate before fracturing. However, a nominal draw ratio that is too high requires a drawing force that typically exceeds the break force of the polymer composition. Desirably, the nominal draw ratio is 8 or less, preferably 6 or less, more preferably 4 or less, even more preferably 3 or less.

The present invention is useful for preparing oriented filled polymer compositions that have a lower density/after orientation than before due to cavitation induced void volume. The process of the present invention surprisingly provides an oriented polymer composition that has both a low density (high void volume due to cavitation) and a substantially stable density (extent of void volume due to cavitation) despite fluctuations in draw rate, especially increases in draw rate. The oriented polymer compositions prepared by the present process are useful as alternatives to wood products in, for example, the decking industry.

EXAMPLES

The following examples serve to further illustrate embodiments of the present invention.

Preparation of Polymer Compositions

Prepare polymer compositions "a" through "h" (described in Table 1) by the following procedure: compound the polymer and filler using a suitable mixing extruder, for example a Farrell Continuous Mixer (FCM) or co-rotating twin screw extruder. Feed polymer and filler at the specified weight ratio through standard loss in weight feeders. Melt the polymer in the mixing extruder and mix the filler into the polymer matrix to form a polymer/filler mix. Feed the polymer/filler mix from the mixing extruder into a suitable pumping device (for example, a single screw extruder or gear pump) and then through a multi-hole strand die to produce multiple strands of the polymer/filler mix. Cool the strands under water and cut them into pellets. Re-extrude the pellets into individual polymer composition billets having a larger cross section than a desired drawn polymer composition. Alternatively the polymer/filler mix may be pumped directly from the pumping device through an extrusion die and then cooled to produce individual polymer composition billets.

As a continuous process alternative, the polymer/filler mix may be pumped directly from the pumping device, through an extrusion die to continuously produce a polymer composition billet that is continuously conditioned to within a drawing temperature range and then continuously drawn to an oriented polymer composition. This process precludes having to form individual billets prior to drawing.

TABLE 1

Initial Polymer Compositions

| Polymer Composition | Polymer Composition $T_s$ (° C.) | Polymer | Filler |
|---|---|---|---|
| a | 163 | Nucleated polypropylene-ethylene random copolymer having 0.5 wt % ethylene component and a melt flow rate of 3 (e.g., INSPIRE ® | 46 wt % Talc composition based on total composition weight. Talc composition is 50-60 wt % talc and 40-50 wt % magnesium |

TABLE 1-continued

Initial Polymer Compositions

| Polymer Composition | Polymer Composition $T_s$ (° C.) | Polymer | Filler |
|---|---|---|---|
| | | Performance Polymer D404.1 resin available from The Dow Chemical Company. INSPIRE is a trademark of The Dow Chemical Company). | carbonates having a median diameter of 16.4 microns. (e.g., TC-100 from Luzenac) |
| b | 163 | [same as (a)] | 46 wt % Calcium carbonate having a mean particle size of 1.1 microns (e.g., Supercoat from Imersys), with wt % based on total composition weight. |
| c | 148 | Polypropylene-ethylene random copolymer having 3.2 wt % ethylene and a melt flow rate of 1.9 (e.g., 6D83K from The Dow Chemical Company). | 46 wt % fly ash as received from Headwaters Resources (e.g. Class F from Headwaters) |
| d | 148 | [same as (c)] | [same as (a)] |
| e | 160 | Polypropylene homopolymer with a melt flow rate of 2.8. | [same as (a)] |
| f | 163 | [same as (a)] | 30 wt % 80 mesh pine wood flour base don total polymer composition weight. Suitable pine wood flour is available from American Wood Fibers. |
| g | 148 | [same as (c)] | [same as (f)] |
| h | 160 | [same as (e)] | [same as (f)] |

Drawing Procedure

Mill a polymer composition billet to have cross sectional dimensions associated with the nominal draw ratio for a specific example (see each example for its corresponding nominal draw ratio). Table 2 gives the dimensions of the billets for the corresponding nominal draw ratios. Mill an initial tab on an end of each billet that is smaller in dimension than any point in the shaping channel and longer than the length of the die. The tab extends through the die for attaching an actuator to pull the rest of the billet through the die.

TABLE 2

Milled Billet Dimensions

| Nominal Draw Ratio | Milled Billet Width, cm (inch) | Milled Billet Height, cm (inch) |
|---|---|---|
| 2 | 1.80 (0.707) | 0.450 (0.177) |
| 4 | 2.54 (1.0) | 0.635 (0.25) |
| 6 | 3.11 (1.225) | 0.78 (0.306) |

Draw the billets using a proportional die with a die entrance opening larger than the cross section of the billet being drawn, and a die exit opening of 1.27 cm (0.5 inches) by 0.3175 cm (0.125 inches) and a rectangular shaping channel having cross sectional dimensions substantially proportional to one another and the polymer billet. The walls spanning the height of the channel converge at 15° angle to reduce the width while the walls spanning the width dimension converge at a 3.8.3° angle to reduce the height.

Condition each billet to within a drawing temperature range prior to drawing through the drawing die. Each example below specifies a drawing temperature to condition the polymer composition to in order to initiate drawing. Draw a billet through a drawing die by extending the initial tab through the drawing die, gripping the tab with an actuator and then pulling the billet through the drawing die using an MTS hydraulic tester, model number 205. Center the billet in the shaping channel of each die. Draw the billet slowly at first to orient the leading edge and then bring to a specific draw rate while maintaining the die at a temperature within 5° C. of the drawing temperature.

Example (Ex) 1

Varied Drawing Temperature

Table 3 provides drawing temperature, draw rate and oriented polymer composition density for drawing a polymer billet of polymer composition "a" using a nominal draw ratio of 2.

TABLE 3

| Example | Drawing Temperature (° C. below polymer composition $T_s$) | Draw Rate (cm/min) | Oriented Polymer Composition Density (g/cm³) |
|---|---|---|---|
| 1(a) | 10 | 2.54 | 1.09 |
| 1(b) | 10 | 25.4 | 0.95 |
| 1(c) | 10 | 127 | 0.82 |
| 1(d) | 10 | 254 | 0.84 |
| 1(e) | 10 | 508 | 0.85 |
| 1(f) | 20 | 2.54 | 0.89 |
| 1(g) | 20 | 25.4 | 0.82 |
| 1(h) | 20 | 50.8 | 0.79 |
| 1(i) | 20 | 101 | 0.75 |
| 1(j) | 20 | 127 | 0.73 |
| 1(k) | 20 | 178 | 0.72 |
| 1(m) | 20 | 254 | 0.73 |
| 1(n) | 20 | 381 | 0.73 |
| 1(o) | 20 | 508 | 0.71 |
| 1(p) | 30 | 2.54 | 0.93 |
| 1(q) | 30 | 25.4 | 0.75 |
| 1(r) | 30 | 50.8 | 0.65 |
| 1(s) | 30 | 127 | 0.65 |
| 1(t) | 30 | 254 | 0.68 |
| 1(u) | 30 | 508 | 0.69 |

Example 1 illustrates that an oriented polymer composition density is substantially stable at a draw rate of 127 centimeters per minute (cm/min) and faster regardless of drawing temperature.

Example 2

Varied Polymer Material

Draw billets of polymer compositions "f", "g" and "h" at a drawing temperature of 10° C. below $T_s$ using a nominal draw ratio of 2. Table 4 provides the resulting density for each of the billets at various drawing rates.

TABLE 4

| Example | Polymer Composition | Draw Rate (cm/min) | Oriented Polymer Composition Density (g/cm³) |
|---|---|---|---|
| 2(a) | f | 2.54 | 0.59 |
| 2(b) | f | 254 | 0.53 |
| 2(c) | f | 508 | 0.53 |
| 2(d) | f | 1016 | 0.53 |
| 2(e) | f | 2540 | 0.52 |
| 2(f) | g | 2.54 | 0.76 |
| 2(g) | g | 25.4 | 0.66 |
| 2(h) | g | 254 | 0.61 |
| 2(i) | g | 508 | 0.62 |
| 2(j) | h | 2.54 | 0.70 |
| 2(k) | h | 25.4 | 0.56 |
| 2(l) | h | 127 | 0.59 |
| 2(m) | h | 254 | 0.56 |

Example 2 illustrates that regardless of polymer composition, an oriented polymer composition has a substantially stable density due to cavitation at a draw rate of 127 cm/min or faster when using a nominal draw ratio of 2 and a drawing temperature of 10° C. below $T_s$. Similar results are expected at other nominal draw ratios and drawing temperatures (illustrations of which are in other Examples herein).

Example 3

Varied Filler

Draw billets of polymer compositions "a", "b" and "c" at a drawing temperature of 20° C. below $T_s$ using a nominal draw ratio of 4. Table 5 provides the resulting density for each of the billets at various drawing rates.

TABLE 5

| Example | Polymer Composition | Draw Rate (cm/min) | Oriented Polymer Composition Density (g/cm³) |
|---|---|---|---|
| 3(a) | a | 2.54 | 0.89 |
| 3(b) | a | 25.4 | 0.82 |
| 3(c) | a | 50.8 | 0.79 |
| 3(d) | a | 102 | 0.75 |
| 3(e) | a | 127 | 0.72 |
| 3(f) | a | 254 | 0.73 |
| 3(g) | a | 381 | 0.73 |
| 3(h) | a | 508 | 0.71 |
| 3(i) | f | 2.54 | 0.66 |
| 3(j) | f | 25.4 | 0.63 |
| 3(k) | f | 50.8 | 0.60 |
| 3(l) | f | 102 | 0.57 |
| 3(m) | f | 127 | 0.56 |
| 3(n) | f | 203 | 0.58 |
| 3(o) | f | 254 | 0.60 |
| 3(p) | b | 2.54 | 1.14 |
| 3(q) | b | 25.4 | 1.01 |
| 3(r) | b | 50.8 | 0.93 |
| 3(s) | b | 76.2 | 0.93 |
| 3(t) | b | 102 | 0.88 |
| 3(u) | b | 127 | 0.89 |
| 3(v) | b | 152 | 0.88 |
| 3(w) | b | 203 | 0.84 |
| 3(x) | b | 254 | 0.86 |

Example 3 illustrates that regardless of filler, an oriented polymer composition achieves a substantially stable density due to cavitation at or before a draw rate of 127 cm/min when using a nominal draw ratio of 4 and a drawing temperature of 20° C. below $T_s$. Similar results are expected at other nominal draw ratios and drawing temperatures (illustrations of which are in other Examples herein).

Example 4

Varied Nominal Draw Ratio

Draw billets of polymer composition "a" at a drawing temperature of 10° C. below $T_s$ using a nominal draw ratio of 2, 4 or 6. Table 6 provides the resulting density for each of the billets at various drawing rates for each nominal draw ratio.

TABLE 6

| Example | Nominal Draw Ratio | Draw Rate (cm/min) | Oriented Polymer Composition Density (g/cm³) |
|---|---|---|---|
| 4(a) | 2 | 2.54 | 1.16 |
| 4(b) | 2 | 25.4 | 0.87 |
| 4(c) | 2 | 127 | 0.90 |
| 4(d) | 2 | 254 | 1.05 |
| 4(e) | 2 | 508 | 0.96 |
| 4(f) | 4 | 2.54 | 1.09 |
| 4(g) | 4 | 25.4 | 0.95 |
| 4(h) | 4 | 127 | 0.82 |
| 4(i) | 4 | 254 | 0.84 |
| 4(j) | 4 | 508 | 0.85 |
| 4(k) | 6 | 2.54 | 1.10 |
| 4(l) | 6 | 25.4 | 0.95 |
| 4(m) | 6 | 50.8 | 0.88 |
| 4(n) | 6 | 76.2 | 0.87 |
| 4(o) | 6 | 102 | 0.88 |
| 4(p) | 6 | 127 | 0.85 |
| 4(q) | 6 | 178 | 0.86 |
| 4(r) | 6 | 254 | 0.80 |

TABLE 6-continued

| Example | Nominal Draw Ratio | Draw Rate (cm/min) | Oriented Polymer Composition Density (g/cm³) |
|---|---|---|---|
| 4(s) | 6 | 381 | 0.84 |
| 4(t) | 6 | 508 | 0.84 |

Example 4 illustrates that regardless of nominal draw ratio an oriented polymer composition achieves a substantially stable density due to cavitation at or before a draw rate of 127 cm/min. Similar results are expected at other drawing temperatures and polymer compositions.

What is claimed is:

1. A process for solid state die drawing a polymer composition comprising:
   (a) providing a polymer composition comprising a filler and an orientable polymer, the polymer composition having a softening temperature, wherein the filler is organic, inorganic or a combination of organic and inorganic;
   (b) forming a billet from the polymer composition;
   (c) conditioning the temperature of the polymer composition to within an average drawing temperature, wherein the average drawing temperature is the average of the highest and lowest temperature along the cross sectional dimension and is at least 20° C. below the softening temperature and less than or equal to 40° C. below the softening temperature;
   (d) providing the billet to a drawing die, wherein the cross sectional dimensions of the billet before entering the drawing die and an exit of the drawing die correspond to a nominal draw ratio in the range of 1.2-8;
   (e) initiating drawing of the polymer composition while the polymer composition remains at the average drawing temperature;
   (f) drawing the conditioned polymer composition at the average drawing temperature through the drawing die at a minimum drawing rate of at least 127 centimeters (50 inches) per minute and a maximum drawing rate representative of a drawing force less than a tensile strength of the die drawn polymer composition; and
   (g) maintaining, during drawing, the temperature of the polymer composition at two different points along a cross sectional dimension of the polymer composition so that the temperature at the two different points differs by 10% or less from the average drawing temperature to reach a cavitation plateau in which a density of the die drawn polymer composition at the cavitation plateau differs by 10% or less from an average density calculated from the density of the polymer composition resulting from drawing at a rate above the minimum drawing rate for drawing rates differing by at least 10 centimeters per minute at a given average drawing temperature, wherein all cross sectional dimensions of the die drawn polymer are greater than 1.5 millimeters.

2. The process of claim 1, wherein the drawing die induces proportional drawing of the polymer composition.

3. The process of claim 1, wherein the polymer composition remains at the average drawing temperature as it draws.

4. The process of claim 1, wherein the filler is an inert inorganic filler.

5. The process of claim 1, wherein the filler is selected from a group consisting of talc, fly ash, clay or calcium carbonate.

6. The process of claim 1, wherein the orientable polymer is one or more than one semi-crystalline polymer.

7. The process of claim 1, wherein the orientable polymer is a polyolefin.

8. The process of claim 1, wherein the orientable polymer is selected from a polypropylene-based polymer or high density polyethylene.

9. The process of claim 1, wherein the drawing rate is at least 150 centimeters (60 inches) per minute.

10. The process of claim 1, wherein the drawing rate is at least 254 centimeters (100 inches) per minute.

11. The process of claim 1, wherein the filler is present at a concentration of 20 percent by weight or more relative to polymer composition weight before drawing.

12. The process of claim 1, wherein the process induces at least 30 percent by volume of void space into the polymer composition.

13. The process of claim 1, wherein the nominal draw ratio is in the range of 1.2 to 3.

* * * * *